(12) United States Patent
Shemer et al.

(10) Patent No.: US 11,669,410 B2
(45) Date of Patent: Jun. 6, 2023

(54) DYNAMICALLY SELECTING OPTIMAL INSTANCE TYPE FOR DISASTER RECOVERY IN THE CLOUD

(71) Applicant: EMC IP Holding Company LLC, Hopkinton, MA (US)

(72) Inventors: Jehuda Shemer, Kfar Saba (IL); Boris Shpilyuck, Ashdod (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 153 days.

(21) Appl. No.: 16/985,356

(22) Filed: Aug. 5, 2020

(65) Prior Publication Data
US 2022/0043721 A1    Feb. 10, 2022

(51) Int. Cl.
*G06F 11/14*   (2006.01)
*G06F 9/455*   (2018.01)
*G06Q 30/0283* (2023.01)

(52) U.S. Cl.
CPC ...... *G06F 11/1469* (2013.01); *G06F 9/45558* (2013.01); *G06F 11/1464* (2013.01); *G06F 11/1484* (2013.01); *G06Q 30/0283* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 7,729,926 B1 * | 6/2010 | Hopwood | G06Q 30/0283 705/400 |
| 10,204,019 B1 | 2/2019 | Talley et al. | |
| 2003/0177149 A1 * | 9/2003 | Coombs | G06F 11/1469 |
| 2011/0087874 A1 | 4/2011 | Timashev et al. | |
| 2011/0202734 A1 * | 8/2011 | Dhakras | G06F 9/45533 718/1 |
| 2018/0285216 A1 * | 10/2018 | Wu | G06F 11/1469 |

OTHER PUBLICATIONS

"Virtualization via Virtual Machines" Donald Firesmith, Sep. 18, 2017, 8 pages, file:///C:/Users/malsip/Desktop/Virtualization%20via%20Virtual%20Machines.pdf (Year: 2017).*

* cited by examiner

*Primary Examiner* — Michael Alsip
(74) *Attorney, Agent, or Firm* — Workman Nydegger

(57) ABSTRACT

The selection of an optimal restore instance type based on a customer's speed/cost tradeoff resolution is disclosed. An automated restore activity may be performed on a baseline test VM of a predefined size using different restore instance types. The number of calibration runs or evaluations needed to identify an optimal restore instance type in terms of performance and price, with respect to bandwidth or other constraining factor, is performed on less than all of the restore instance types.

12 Claims, 6 Drawing Sheets

| Model | VCPU | Memory (GiB) | Instance Storage | Bandwidth Gbps | Price per Hour |
|---|---|---|---|---|---|
| 1 | 2 | 4 | EBS | Up to 10 | $0.085 |
| 2 | 4 | 7 | EBS | Up to 10 | $0.17 |
| 3 | 8 | 16 | EBS | Up to 10 | $0.34 |
| 4 | 16 | 32 | EBS | Up to 10 | $0.68 |
| 5 | 36 | 72 | EBS | 10 | $1.53 |
| 6 | 48 | 96 | EBS | 12 | $2.04 |
| 7 | 72 | 144 | EBS | 25 | $3.06 |
| 8 | 96 | 192 | EBS | 25 | $4.08 |

90

| Model | vCPU | Memory (GiB) | Instance Storage | Bandwidth (Gbps) | Price Per Hour | Performance |
|---|---|---|---|---|---|---|
| 1 | 2 | 4 | EBS | 1 | $0.085 | 4 |
| 2 | 4 | 8 | EBS | 1 | $0.17 | 9 |
| 3 | 8 | 16 | EBS | 1 | $0.34 | 12 |
| 4 | 16 | 32 | EBS | 1 | $0.68 | 16 |
| 5 | 36 | 72 | EBS | 1 | $1.53 | 20 |
| 6 | 48 | 96 | EBS | 1 | $2.04 | 25 |
| 7 | 72 | 144 | EBS | 1 | $3.06 | 25 |
| 8 | 96 | 192 | EBS | 1 | $4.08 | 25 |

Figure 6

DYNAMICALLY SELECTING OPTIMAL INSTANCE TYPE FOR DISASTER RECOVERY IN THE CLOUD

FIELD OF THE INVENTION

Embodiments of the present invention generally relate to data protection and data protection operations. More particularly, at least some embodiments of the invention relate to systems, hardware, software, computer-readable media, and methods for selecting virtual machine (VM) instance type for data protection operations including cloud-based recovery operations.

BACKGROUND

Entities often generate and use data that is important in some way to their operations. This data can include, for example, business data, financial data, and personnel data. If this data were lost or compromised, the entity may realize significant adverse financial and other consequences. Accordingly, many entities have chosen to back up some or all of their data so that in the event of a natural disaster, unauthorized access, or other events, they can recover any data that was compromised or lost, and then restore that data to one or more locations, machines, and/or environments.

Disaster recovery (DR), the recovery and restoration of backed up data after a problem or loss has occurred, is an important process for organizations. One approach to disaster recovery is to create a temporary restore VM in a cloud storage environment. When called upon, the restore VM executes a disaster recovery process. This approach, however, has proved problematic for various reasons.

For example, the disaster recovery process may take a long time to perform for a large VM. As well, the cost for the disaster recovery process would be accordingly high, since cloud usage is typically paid on an hourly basis. On the other hand, a smaller VM may instead be employed for DR, but the smaller VM would lack some of the functionality of the larger VM. Consequently, the organization may have to strike a balance between, for example, the speed with which a DR process is required to be performed, and the cost for performing that process.

Thus, one challenge facing organizations is deciding which cloud instance type would be the most optimal for performing the various restore tasks assigned to the VM for execution. A simple approach might be to select the least expensive, in terms of cloud usage cost, VM restore instance type in the cloud. This seems to ensure that the price for each hour of restore activity performed by that VM is minimized. However, it may be possible that selecting a higher performance VM restore instance type, despite being more expensive, will lead to overall cost saving because the restore work will be completed relatively more quickly. In this hypothetical case, the customer might benefit from both quicker completion of DR and a lower price paid for restore activity.

Still other factors complicate the analysis with respect to which VM type will be used for a DR process. Such factors include, but are not limited to, different customer VM sizes and/or types, and differing customer preferences with respect to the speed/cost tradeoff for different respective VMs.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 6 illustrates an example of performing a binary search for selecting an optimal restore instance type for performing a data protection operation.

DETAILED DESCRIPTION OF SOME EXAMPLE EMBODIMENTS

Embodiments of the present invention generally relate to data protection and data protection operations. More particularly, at least some embodiments of the invention relate to systems, hardware, software, computer-readable media, and methods for selecting, in view of various competing considerations, an virtual machine (VM) instance type for cloud-based disaster recovery operations or other data protection operations. Example data protection operations include recovering production virtual machines (VMs) to target VMs, failing over production VMs, testing operations, evaluating virtual machines based on virtual machine instance types, or the like or combination thereof.

Embodiments of the invention relate to identifying a virtual machine instance type that is used to deploy virtual machines. The process of selecting a virtual machine instance type may be based on an analysis of a potential operation. For example, it may be necessary to perform a recovery operation in a datacenter (e.g., in the cloud). By selecting a restore instance type in advance, a virtual machine can be launched based on the selected restore instance type to perform the operation. The selection of a restore instance type may include performing a calibration run or an evaluation on virtual machines that are based on virtual machine instance types. The results of these calibration runs or evaluations allows a restore instance type of be pre-selected and ensures that the operations performed by the virtual machine(s) based on the selected restore instance type(s) will perform the operations in accordance with a customer's expectations. Virtual machine restore instance types may be referred to herein as VM restore instance types, restore instance types, RI types, or the like.

In the context of data protection, the virtual machines that are based on the selected restore instance type may perform recovery operations such as those performed by DELL's CloudDR. More specifically, there are other tasks, in addition to restore or recovery operations, such as data consolidation and retention management operations, that may be performed by virtual machines that are based on the restore instance types. The cost of running virtual machines can be expensive and embodiments of the invention allow the optimal restore instance types to be identified or determined in advance in a manner that reduces costs.

More particularly, example embodiments of the invention embrace, among other things, automated processes for selecting an optimal restore instance type in order to optimize the restore cost and time for the customer, while also improving the overall customer experience. The selection of a restore instance type is performed because cloud providers may only provide certain configurations for virtual machines. For example, these configurations are often specified in terms of virtual CPUs, Memory (GIB), Instance Storage (e.g., EBS) and network bandwidth (Gbps).

Figure 1:
FIG. 1 illustrates examples of virtual machine restore instance types available from a cloud provider or available in a datacenter.

FIG. 1 is a table illustrating example virtual machine restore instance types that may be available from a cloud provider. FIG. 1 also illustrates the associated cost of virtual machines that are based on these restore instance types. The table 90 illustrates, by way of example only, 8 models or restore instance types. However, the number of models actually available may be different. In some examples, hundreds of restore type instances may be available from a cloud provider. In addition, different datacenters in different regions (even if the same cloud provider) may offer different restore instance types. Further, the prices at different datacenters may vary. Further, the same restore instance types may have different performance characteristics at different datacenters. For example, the virtual machines at different datacenters may run on different hardware, and the like. A vCPU (memory, networking, etc.) at one datacenter could be different from the vCPU at another datacenter.

As a result of these various restore instance types, it may be difficult to exactly match or determine the restore instance type that is optimal for a given data protection operation. The selection of a restore instance type is significant at least because of the effect on overall cost, RTO (Recovery Time Objective), and the like. Example embodiments of the invention are well suited to deal with the complexity of selecting an optimal restore instance type.

When restoring a VM, the process is typically performed by a restore VM that is based on a restore instance type. Some of the processes performed by the restore VM include creating disks of the same sizes as the protected VM of the customer, LU reading the backup data copies from cloud storage and writing those copies to the newly created disks, and then installing the required device drivers on the target VM. More specifically, it may be necessary for the restore VM to hydrate an operating system disk and hydrate data disks during a disaster recovery operation. Once hydration is complete, the hydrated disks can be attached and mounted to a target VM. During operations such as disaster recovery, the VM being recovered (the target VM) typically resides in the cloud (e.g., a datacenter). These processes take time and embodiments of the invention determine the optimal recovery instance type for the restore VM performing these and other operations.

Selection of the optimal restore instance type, may depend on several factors including on the original size of the customer VM. To illustrate, for a VM of 2 TB size, the optimal restore instance type may be different than for a VM of 100 GB. Also some restore instance types may be available only in certain cloud regions. In addition, the priority of some customers may be to reduce the DR cost, while other customers may prefer a faster DR time and are not as concerned with the DR cost. A customer preference, for example, with respect to cost versus speed, may be dependent on considerations such as the RTO (Recovery Time Objective) of the specific VM that needs to be recovered. As these examples illustrate, a variety of competing considerations may come into play, and thus lend complexity, when a decision has to be made regarding an optimal restore instance type.

As an additional complication, predefining an optimal VM restore instance type based on manual tests is difficult, or impossible, in at least some instances. For LU example, new restore instance types are introduced by cloud providers from time to time. Also, cloud vendors pricing models may change over time. Thus, restore instance type evaluations should be performed repeatedly, with many restore instance types across many regions, to ensure that the optimal restore instance type(s) is/are being employed. For these reasons, example embodiments of the invention embrace methods and processes for automatically selecting an optimal restore instance type for data protection operations including disaster recovery processes.

Embodiments of the invention provide for automation of the selection of optimal restore instance type (often customer and/or virtual machine specific) based on the speed/cost tradeoff resolution policy (TR policy) of that customer. In order to determine the desired or optimal restore instance type, a data protection system may periodically perform an automated restore activity (e.g., a calibration run or evaluation) on a baseline test VM. Based on the time required to complete the restore operations for the baseline test VM using a restore VM based on a particular restore instance type, the time needed to complete the restore for any customer VM can be approximately determined. Similarly, all of the restore instance types available from a given cloud provider or vendor (e.g., Amazon Web Services (AWS) Simple Storage Service (S3)), can be used to restore the baseline test VM. By performing a recovery operation on a baseline test VM for each restore instance type, the recovery time can be determined or approximated for a VM of any size for each restore instance type. Likewise, the hourly cost of any restore VM based on a restore instance type per each cloud vendor, and per each region, is also known or can be approximated.

As a result, for each customer VM and for each restore instance type, the restore completion time (RC time) and restore completion price (RC price) are known or can be substantially approximated. The speed/cost tradeoff resolution policy (TR policy) per each VM (or other grouping) will be provided by the customer. By way of illustration, some example policies include "prefer lowest cost" or "prefer highest (restore) speed."

Next, a resolution function is applied based on restore time and restore cost arguments. The restore instance type that receives the highest rank, per the resolution function, is then selected for the specific customer VM. For example, RANK=TR policy[RC time, RC price]. When a full DR Test, or a real DR Failover, is performed with respect to that specific customer VM, the pre-defined or pre-determined restore instance type can be used to instantiate a restore VM.

The performance and cost evaluation is an example of a calibration mechanism that performs an operation using all restore instance types per region, in order to get a baseline for ranking the restore instance types. The result is a rank table per restore instance type in each region. The rank table can be expanded to account for multiple regions. This calibration mechanism can be run periodically to make sure the rank table is accurate and updated and to account for new restore instance types and price changes.

While a calibration or test can be performed for each restore instance type, generating a calibration table that includes test results for all restore instance types can be expensive. Embodiments of the invention further improve this calibration LU mechanism by accounting for factors or characteristics of the restore process and/or by performing fewer tests or calibration runs. For example, the restore process may be impacted by CPU/Memory or communication bandwidth. Smaller instances may experience a bottleneck with regard to CPU/memory while larger instances may experience a bottleneck with regard to larger instances.

Embodiments of the invention are able to generate the rank table more efficiently by accounting for or factoring in the VM limitations (e.g., networking limitations). In addition, the number of calibration runs or evaluations is reduced from an exhaustive run of the restore instance types to a small sample of the restore instance types. More specifically, rather than run an evaluation for every restore instance type, the evaluations may account for limiting factors such as bandwidth. This allows a binary search to be performed to find an optimal restore instance type. The binary search performs fewer calibration runs and can identify the restore instance type that offers the best performance at the best price. Advantageously, the resulting rank table has substantially fewer entries. Plus, the evaluation results for untested restore instance types can be interpolated or otherwise inferred. This advantageously optimizes the cost and time and improves the overall customer experience.

To illustrate, an embodiment of the invention may provide processes for automatically configuring and instantiating a restore VM (also referred to an a VM instance) based on a plurality of competing considerations. Further, an embodiment of the invention can periodically, and automatically, evaluate the operating environment to identify changes in parameters of the environment where the restore VM will be implemented. Finally, an embodiment of the invention can configure/reconfigure a restore VM automatically in response to one or more of such parameter changes.

Figure 2:
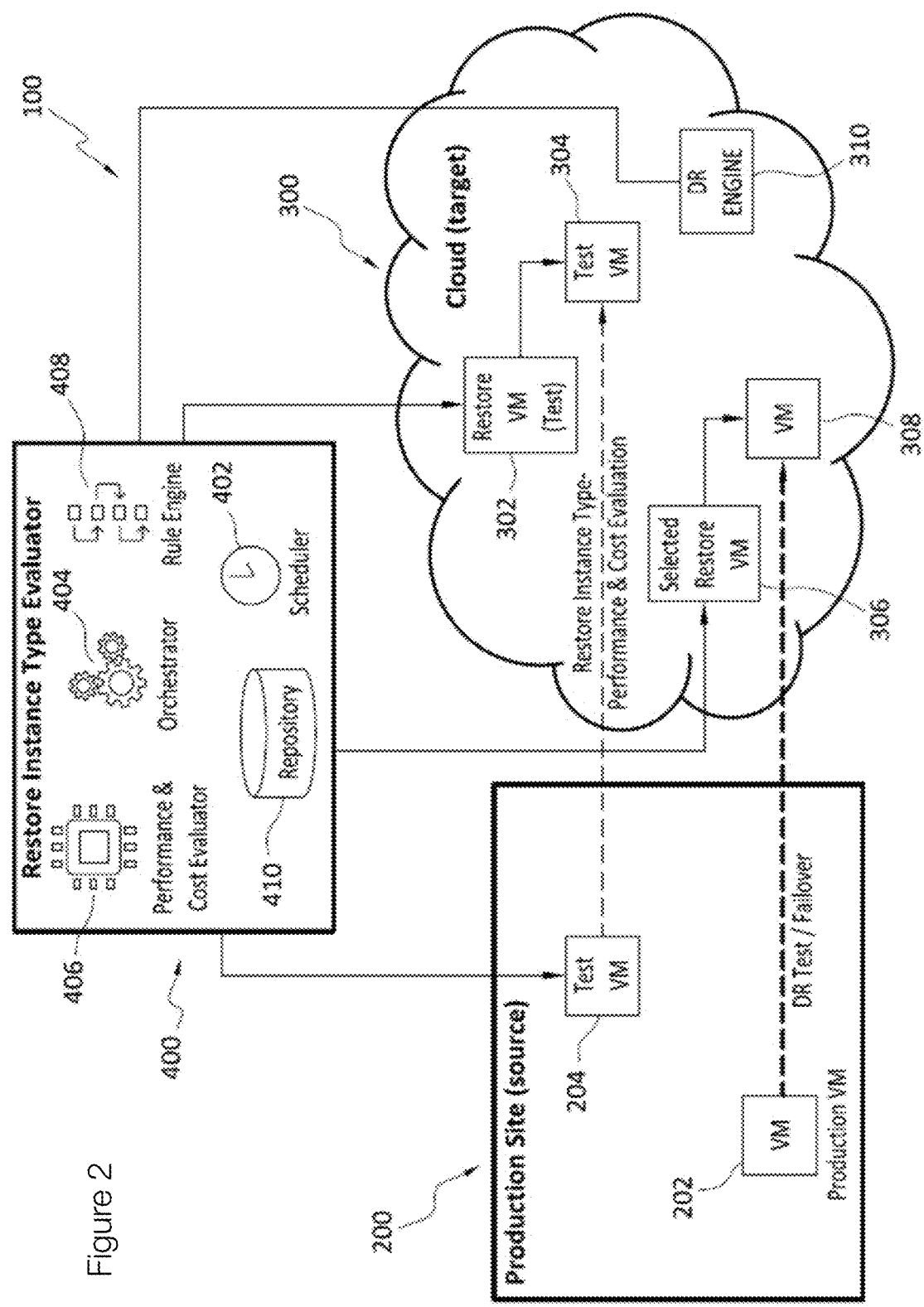
FIG. 2 discloses aspects of an example operating environment for some embodiments of the invention.

With attention now to FIG. 2, an operating environment 100 may comprise, or consist of, a data protection environment and a data protection system may be implemented therein. The data protection system is configured to perform data protection operations including disaster recovery operations, failover operations, restore instance type selection operations, or the like or combination thereof. The data protection environment can include an enterprise datacenter, or a cloud datacenter, or both. The data protection environment may support various data protection processes, including data replication, data deduplication, cloning, data backup, and data restoration, for example. As used herein, the term backups is intended to be construed broadly and includes, but is not limited to, partial backups, incremental backups, full backups, clones, snapshots, continuous replication, and any other type of copies of data, and any combination of the foregoing. Any of the foregoing may, or may not, be deduplicated.

As indicated, the example operating environment 100 configuration in FIG. 2 comprises a production site 200, cloud storage site 300, and a restore instance type evaluator (RITE) site 400, which is an example of a data protection system or a portion of a data protection system. All of these elements are configured to, and do, communicate with each other in connection with the implementation of various embodiments of the invention.

In general, one or more production VMs operate at the production site 200 and/or at the cloud site 300. In order to provide for disaster recovery of a production VM in the event that a problem occurs at the production site 200 or for other reasons, a restore VM (which may be temporary) is created at the cloud site 300.

The restore VM, which may also be referred to herein as a restore or restore VM instance, resides at the cloud site 300 and is operable to perform various data protection operations. The RITE 400 is configured to determine a restore instance type based at least in part on criteria identified by an administrator or other user and the restore VM is based on the determined restore instance type.

The restore VM instance residing at the cloud site 300 performs various data protection operations. These data protection operations performed by the restore VM may include, but are not limited to, building, at the cloud site 300, a VM that corresponds to the production VM being restored or recovered. In this way, the functionality of the production site 200 VM is restored at the cloud site 300 and is available for use, notwithstanding the occurrence of a problem at the production site 200. In some instances, the VM that was built at the cloud site 300 by the restore VM may additionally, or alternatively, be restored to the production site 200 after the production site 200 problem has been resolved.

The restore VM, which is based on a restore instance type that was previously selected or determined, restores a VM in a manner that is consistent with parameters set by an administrator or other user. Such parameters include, but are not limited to, the cost to restore the VM, the speed with which the VM is restored, and the LU functionality desired in the restored VM. A single restore VM can be used to restore a single VM, or multiple VMs, to the cloud storage site 300 and/or to the production site 200 or to perform other data protection operations. Multiple restore VMs may also be used and may be based on the same or different restore instance types.

With particular reference now to FIG. 2, further details are provided concerning aspects of the example operating environment 100 and associated elements. As noted, the operating environment 100 may include a production site 200, one example of which is an on-premises site of an enterprise or other organization. New and/or modified data is generated at the production site 200, including one or more VM instances such as the VM instance 202. The VM instance 202 may be referred to as a production VM since it is created at, and/or operates at, the production site 200. The production site 200 may be considered as a data source. Embodiments of the invention may operate in connection with any number or type of data sources.

New and/or modified data generated at the production site may be protected so that such data can be restored at one or more sites if necessary. As noted, embodiments of the invention provide for determining a particular VM restore instance type operable to restore one or more VMs. A baseline test VM 204 is used as part of the process of determining which restore instance type to use for various data protection operations. The baseline test VM may be smaller than the production VM 202.

In some embodiments, the baseline test VM 204 may comprise components that are common across a customer population of production VMs 202. To illustrate, LU the baseline test VM 204 may comprise the same type and number of disks as the VMs in the population of production VMs 202. As well, the baseline test VM 204 may lack components and attributes that, while present in one or more production VMs 202, are not common across the population of production VMs 202, and/or the baseline test VM 204 may comprise relatively less data than any of the production VMs 202. In one example, the baseline test VM 204 may be considered as a 'least common denominator' VM with respect to the production VMs 202 in the population.

One purpose of the baseline test VM 204 is to aid in the selection of a restore instance type from those offered by the cloud provider. In general, and as discussed in more detail elsewhere herein, automated restore processes are performed on the baseline test VM 204 using different restore instance types (or using VMs based on the restore instance types). In this way, relative determinations can be made as to the amount of time that may be involved in restoring customer VMs of various respective sizes. These automated restore processes performed with respect to the baseline test VM 204 may be initiated and/or performed by the RITE 400 automatically, on an ad hoc or scheduled basis, and/or in response to user input or initiation. In some instances, an automated restore process may be performed by the RITE 400 on the baseline test VM 204 whenever a new restore instance type is implemented by, for example, the owner/operator of the cloud storage site 300 or which pricing changes.

As further indicated in FIG. 2, the RITE 400 may create a restore VM 302 at the cloud storage site 300. The restore VM 302 is based on a restore instance type and is operable to perform a restore operation creating the test VM 304 in the cloud storage LU site 300. In other words, the restore VM 302 performs a test of restoring the test VM 204. Creation of the test VM 304 by the restore VM 302 may involve the performance of various processes such as, but not limited to, creating disks of the same sizes as the disks of the test VM 204, reading the backup data copies of the test VM 204 from cloud storage 300 and writing those copies to the newly created disks, and then installing the required device drivers on the test VM 304.

The restore VM 302 may be created by the RITE 400 based on a particular VM restore instance type that can be specified, for example, by a user, or automatically by the RITE 400 for example. The restore instance type may be specific to a particular cloud storage 300 provider or environment. Various other criteria, such as cost to restore (RC price) and time to restore (RC time), for example, may be used by the RITE 400 as a basis to select the restore instance type used to create the restore VM 302. After the restore VM 302 has been created that reflects these criteria, the restore VM 302 operates to perform a data protection operation of restoring the test VM 304.

It will be appreciated that any number of restore VMs 302 may be created, and then run to create any number of test VMs 304. Moreover, the creation, and running, of one or more restore VMs 302 can be performed ad hoc, on a recurring basis, automatically, on an irregular basis, in response to the occurrence or non-occurrence of an event, or on any other basis. In some embodiments, the restore VM 302 may be deleted from cloud storage 300, such as when the restore VM restore instance type of the restore VM 302 is no longer supported by the cloud storage 300 provider. The same is likewise true with respect to a test VM 304 that was created by that restore VM 302.

This type of testing operation is performed in order to measure or determine the performance of VMs based on the restore instance types. The performance results, along with customer input, can be used to select the restore instance type that will be used to perform non-test data protection operations.

In general, the RITE 400 may reside on-premises at the production site 200 or, alternatively, the RITE 400 may be an element of the cloud storage site 300. In still other embodiments, the RITE 400 may reside at a site other than the production site 200 or the cloud storage site 300.

In terms of its operation, the RITE 400 may create and run one or more restore VMs 306 that are based on a restore instance type, which may be determined in advance. The restore VMs 306 can create corresponding VMs 308. The VMs 308, in one example, are restored instances of the VMs 202. Of course, the selected restore VM 306 may restore multiple production VMs. In general, creation of a restore VM 306 may be performed by the RITE 400 after various criteria, which may correspond to a particular restore instance type, have been specified concerning the processes that will be used by the restore VM 306 to create the VM 308. Such criteria may include, but are not limited to, the cost for the restore VM 306 to restore (RC price) the VM 308, and the amount of time needed for the restore VM 306 to restore (RC time) the VM 308. The cost to restore may be based on the price structure, such as $/GB, imposed by the operator of the storage site 300. In at least some instances, the cost to restore may be relatively higher for large/complex VMs and relatively smaller for small/simple VMs, although this is not necessarily the case.

With particular reference now to the RITE 400, further details are provided concerning evaluation of various VM restore instance types, such as may be performed by the RITE 400. In general, the RITE 400 operates to automate the selection of optimal VM restore instance type (RI type) per any specific customer VM based on criteria such as the speed/cost tradeoff resolution policy (TR policy) of that customer, for that specific VM.

The RITE 400 will periodically perform an automated restore activity on the baseline test VM 204 of a predefined size, using different restore VM restore instance types that are available for a given cloud storage site 300 vendor. That is, and as explained herein, the RITE 400 will create a restore VM 302 that is operable to restore the baseline test VM 204 as test VM 304 at the cloud storage site 300. As a result of performing a restore of the baseline test VM 204, both the time and the cost to restore the baseline test VM 204 are known. This type of calibration run or evaluation can be performed for each restore instance type offered by the cloud provider to identify an optimum or a preferred restore instance type. Embodiments of the invention, as discussed herein, are further able to identify an optimum or a preferred restore instance type by performing calibration runs for less than all of the restore instance types offered by the cloud provider.

Based on the time that is needed to complete the restore activity for the baseline test VM 204 with a specific restore instance type, the RITE 400 will approximately, at least, deduce the time it will take to complete a restore for any customer VM 308 of any other size, and having the same VM restore instance type as LU specified in connection with the automated restore of the baseline test VM 204. Thus, the time that is required to restore any customer VM 308, can be calculated based on performance of the restore of the baseline test VM 204. As well, the hourly cost of restoring any VM restore instance type per each cloud vendor, and per each geographical region, is also known or can be approximated. With this time and cost information known, the customer can generate a recovery or a disaster recovery plan for its VMs.

In particular, the restore completion time (RC time) and restore completion price (RC price) is known, or may be determined, for each VM restore instance type of each particular customer for each region/datacenter of that customer. Thus, the customer (e.g., the operator of the production site 200) can generate and provide a speed/cost tradeoff resolution policy (TR policy) per each VM of the customer. Alternatively, the RITE 400 can generate the policies based on input received from the customer. As noted elsewhere herein, the policy for any particular VM could be very simple, such as "prefer lowest cost" or "prefer highest speed," or the policy may be derived from the protection policy settings for that VM, or VM restore instance type.

In more detail, for each customer VM, each of which may be associated with a corresponding VM restore instance type, a resolution function is applied based on restore time and restore cost arguments. Alternatively, the resolution function may be applied to groupings of VMs or to all of the production VMs.

The VM restore instance type that receives the highest rank, by application of the resolution function, is then selected for the specific customer VM (rank=TR policy[RC time, RC price]). The restore VM, based on the selected VM restore instance type, such as the restore VM 306, is stored at the cloud storage site 300 or instantiated when needed. When a full DR Test or a real DR Failover is performed with respect to that specific customer VM, the restore VM creates the corresponding VM.

For example, when a full DR Test or a real DR Failover is performed with respect to VM 202, the restore VM 306, being of the specified restore VM restore instance type, then runs various DR processes to create the VM 308 at the cloud storage site 300. Because the restore VM 306 is of the specified VM restore instance type, the VM 308 is created by the restore VM 306 according to attributes specified by a user and captured in a particular policy applicable to the VM 202. In one embodiment, the procedure performed to determine the optimal configuration of the restore VM 302 does not automatically cause the configuration of the VM 308 to be the same.

As shown in FIG. 2, the aforementioned, and other, functions of the RITE 400 may be performed using a group of components. For example, the RITE 400 may include a scheduler 402. The scheduler 402 determines when VM restore instance type discovery activity (e.g., calibration runs or evaluations) is performed in a system. The orchestrator 404 is invoked based upon a schedule generated by the scheduler 402.

More particularly, the orchestrator 404 interacts with a VM instance performance and cost evaluator 406. The orchestrator 404 receives, from the VM instance performance and cost evaluator 406, a 4-dimensional vector of the form [region, RI type, RC time, RC price], where 'RI type' refers to a particular VM restore instance type. Thus, the 4-dimensional vector corresponds to the baseline test VM 204, LU and not to any particular customer VM 202. A baseline, that is, 4-dimensional, vector can be generated for each different RI type in a particular region.

As noted, the VM restore instance type, or types, may be specified by a cloud storage provider, or other entity. Thus, the 4-dimensional vector indicates a customer region, a specified VM restore instance type, as well as the restore parameters of time to restore, and a cost to restore, that were measured when performing a restore of the test VM 204 of the specified VM restore instance type in the specified customer region. As noted earlier, the restore of the test VM 204 comprises the creation, by the restore VM 302, of the test VM 304. Thus, the 4-dimensional vector may be referred to as a baseline vector since it is not specific to any particular VM, but is used, as discussed below, as a baseline to create respective 5-dimensional vectors that may each be specific to a particular respective VM.

In particular, based on the 4-dimensional vector generated in connection with restoration of the test VM 204, the orchestrator 404 generates a 5-dimensional vector [region, VM, RI type, RC time, RC price]. Thus, each 5-dimensional vector identifies, among other things, a particular customer VM and customer region. That is, there is a particular 5-dimensional vector for each customer VM in a given region. As well, the RC time and RC price for that particular customer VM are defined by the orchestrator 404 based on the ratio of customer VM size to testing VM size, such as the ratio of VM 202 size to test VM 204 size (that is, [customer VM size/testing VM size]) that was obtained.

By way of illustration, a customer VM 202 that is about 10 times bigger than the baseline test VM 204, may be expected to have respective restore cost and restore times that are about 10 times higher than the restore cost and restore times of the baseline test VM 204. Since the restore cost and restore time for the test VM are known from the testing VM process, the restore cost and restore time for the actual customer VM 202 can be readily determined using that information in conjunction with the known ratio of VM size to test VM size. As the foregoing example illustrates, each 5-dimensional vector thus contains restore time (RC time) and restore cost (RC cost) information that is specific to a particular customer VM/region and are derived from information collected during baseline testing.

With continued reference to the RITE 400 in FIG. 2, the orchestrator 404 interacts with a rule engine 408 and, for each customer region/VM, the orchestrator 404 will provide the rule engine 408 a speed/cost tradeoff resolution (TR) policy and a specific entry, that is, a particular 5-dimensional vector associated with a particular customer VM in a particular customer region. As noted elsewhere herein, the entry for a particular VM, that is, the 5-dimensional vector for that VM, may take the form: [region, VM, RI type, RC time, RC price]. The TR policy, or more generally the 'tradeoff resolution policy,' may be specified by the customer and provided to the RITE 400. The rule engine 408 and/or one, some, or all, of the other elements of the RITE 400 may be maintained by the customer.

In general, a tradeoff resolution policy (TR policy) is provided by the customer and can reflect the relative priorities of that customer with respect, for example, to restore time and restore cost. For example, a TR policy may include, as arguments, a LU time to restore (RC time) and a cost to restore (RC price). As such, the TR policy can be used, by the rule engine 408 for example, as a basis for ranking, and selecting, particular VM restore instance types for restoration of a particular customer VM. In at least some embodiments, the VM restore instance type that is assigned the highest rank as a result of application of the TR policy would be selected for the specific customer VM, that is, (rank or R=TR policy[RC time, RC price]).

Thus, the TR policy for a particular VM is actually a function that takes the specific 5 dimensional VM entry as a parameter or argument, and returns a number that represents rank 'R.' That is, in expanded form, the function takes the form of F [region, VM, RI type, RC time, RC price]=R. The rule engine 408 applies this function, which can embody a formula such as is discussed herein, and returns a number that represents a rank. The ranks may be stored in a calibration table. As previously stated, the calibration table may be updated regularly, on an ad hoc basis, or for other reasons.

Generally, the rank assigned by the rule engine 408 to a particular entry can reflect how closely the RC time and RC price, in the entry, match an RC time and RC price specified by the customer for the specified VM, RI type, and region. To illustrate with one example, a customer might specify that restore time is weighted as 75% in importance, while restore cost is weighted as 25% in importance. Put another way, restore time is 3× as important to this particular customer as restore cost. Thus, for the rule engine 408 to generate a score for ranking purposes, using the 75/25 example above, the RC time for each entry can be multiplied by 0.75 and the RC cost for each entry can be multiplied by 0.25, and the two products then summed ((RC time×0.75)+ (RC cost×0.25)) to produce an aggregate score 'AS.'

It should be noted that while entries can be ranked by their respective AS, as described above, the scope of the invention is not limited to use of the AS formula. More generally, any other formula can be used to rank the entries. As such, the AS formula is presented only by way of illustration, and not limitation.

Accordingly, other formulas and approaches can also be used as a basis for determining the rank of an entry or of a restore instance type. For example, a function can be employed that selects the fastest VM restore instance type using the following ranking function: F [region, VM, RI type, RC time, RC price]=R=1/RC time. In this example, the higher the RC time, the lower the rank that will be returned. As another example, a function can be employed that selects the least expensive VM restore instance type. More generally, any function can be employed that can be used as a basis for ranking a group of entries. Thus, the scope of the invention is not limited to the examples disclosed herein.

After iterating over all entries per region/VM, the orchestrator 404 then selects the entry with highest rank, as reflected by the AS, or other formula, and saves the triplet of [region, VM, RI type], corresponding to that highest rank, in the system data repository 410. This triplet can then be used to restore the production VM 202, or production VMs 202, to which it corresponds.

With continued reference to FIG. 2, further details are provided concerning various components of the RITE 400. In one example embodiment, the performance and cost evaluator 406 runs the restore of a baseline test VM of predefined LU size per each instance type that is available in each region and produces the 4 dimensional vector [region, RI type, RC cost, RC price]. As well, the rule engine operates to generate a number (rank) based on (i) the provided speed/cost tradeoff resolution policy provided by the customer and (ii) a specific entry related to customer VM in region [region, VM, RI type, RC cost, RC price]. Finally, upon DR initiation, by a customer for example, a DR engine 310 fetches the appropriate VM restore instance type from the system data repository 410 and will create a VM restore instance(s) of that specific type.

Figure 3:
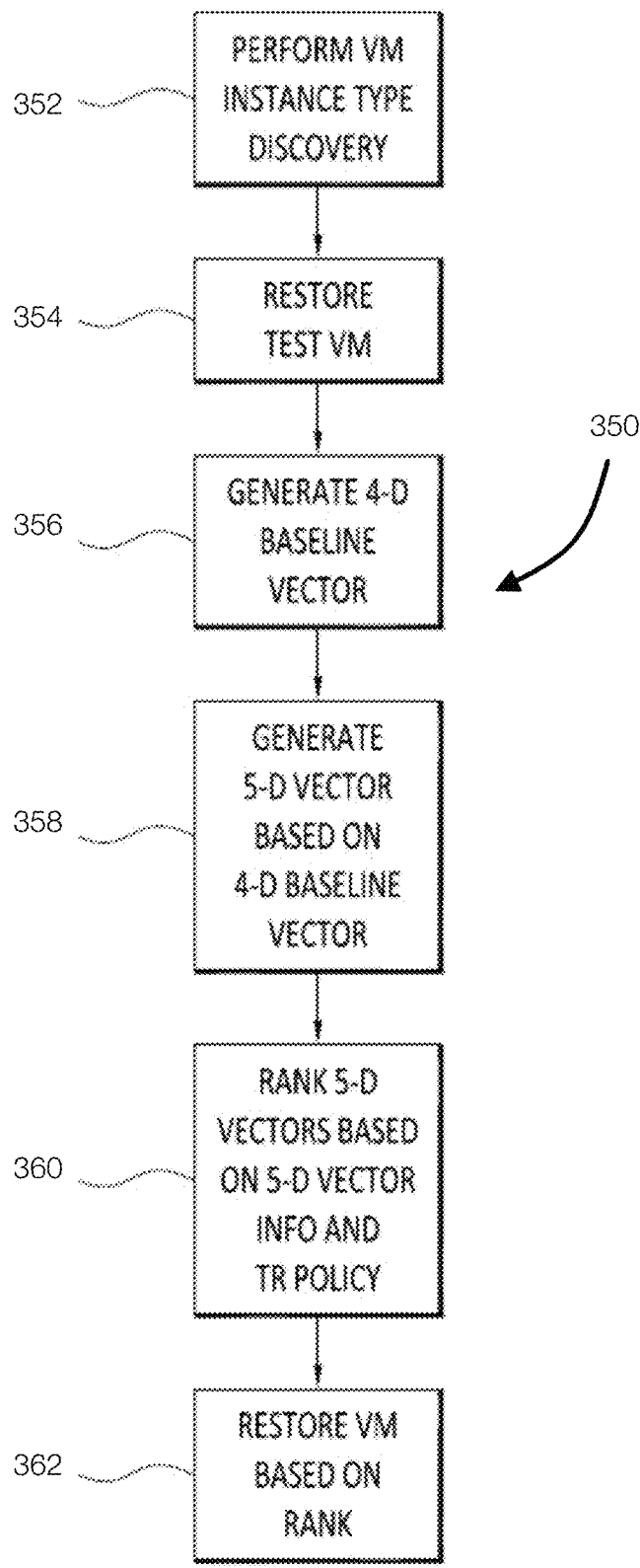
FIG. 3 illustrates an example of a method for evaluating virtual machine restore instance types and selecting an optimal virtual machine restore instance type for performing a data protection operation.

With attention now to FIG. 3, aspects of example methods are disclosed. One particular method is denoted generally at 350 and concerns operations involving restoration of one or more customer VMs.

The method may begin at 352 where a VM restore instance type discovery process is performed. This process 352 may be performed, for example, by an orchestrator that is invoked according to a discovery schedule generated by a scheduling engine. The discovery process 352 may involve surveying one or more regions of a production site and identifying the various different VM restore instance types that are present at the production site. It is possible that any number of different VM restore instance types are present at the production site. The process 352 can be invoked and performed (i) automatically according to a schedule, (ii) responsive to the occurrence or non-occurrence of an event, (iii) on a recurring basis, (iv) on an ad hoc basis, or any combination of these. In connection with the VM restore instance type discovery process 352, the various VM restore instance types discovered can be stored in a repository, along with information such as, but not limited to, customer identity, region, the number of VMs of each type, and VM size(s).

In preparation for restoration 354 of one or more test VMs of particular VM restore instance types, one or more test VMs may be created at the production site. In general, a test VM may take the form of a baseline, or least-common-denominator VM with properties and characteristics that are common to a population of VMs at the production site. As such, the test VM(s) may be smaller in size than the respective VMs that it represents. For each of the test VMs that is created at the production site, a corresponding restore VM is created at the cloud storage site. The restore VM is operable to perform a DR process that results in the restoration of the test VM at the cloud storage site. The restore VM is also based on the restore instance types available from the cloud provider.

After the test VMs, and corresponding restore VM have been created, one or more of the test VMs are restored 354, so as to mimic a DR process. The restoration process 354 results in the creation of a corresponding test VM at the cloud storage site. As part of the restoration process 354, test information concerning the restore process is collected. Such test information may include, but is not limited to, the time that it took to restore a test VM at the cloud storage site, and the cost to restore that test VM.

The test information is then used to generate 356 a 4-D baseline vector that is particular to a specific VM restore instance type, but is not associated with any particular VM of the production site. That is, the 4-D baseline vector is generic to one or more VM instances that all share the same VM restore instance type. The 4-D baseline vector may take the form [region, RI type, RC time, RC price], where the 'region' is a particular region of the production site, 'RI type' is the VM restore instance type, 'RC time' is the time to restore the test VM, and 'RC cost' is the cost to restore that test VM.

Using the 4-D vector, a 5-D vector that is specific to a particular VM of the production site is then generated 358. The 5-D baseline vector may take the form [region, VM, RI type, RC time, RC price], where the 'region' is a particular region of the production site, 'VM' identifies a particular VM of the production site, 'RI type' is the VM restore instance type, 'RC time' is the expected time to restore the VM, and 'RC cost' is the expected cost to restore that test VM. The expected RC time and RC cost of the 5-D vector are generated based on (i) the RC time and RC cost of the test VM that is of the same VM restore instance type as the particular VM identified in the 5-D vector, and (ii) the relation of the size of the VM to the size of the corresponding test VM.

As the foregoing suggests, multiple 5-D vectors may correspond to a given production site VM, where each 5-D vector represents a different respective VM restore instance type. Thus, the 5-D vectors are then ranked 360 to determine which VM restore instance type is best suited for restoration of the specific VM identified in the 5-D vectors. The ranking of the 5-D vectors is performed 360 based on the 5-D vectors and on the customer speed/cost tradeoff resolution policy (TR policy). The TR policy, in conjunction with the 5-D vectors, thus enables a determination to be made as to the extent to which each VM restore instance type reflects the needs of the customer. In at least some embodiments, the 5-D vectors are thus ranked from high to low, where the highest ranked 5-D vector best reflects the customer TR policy.

Once the 5-D vectors have been ranked 360, the VM identified in the 5-D LU vectors is then restored 362 using the VM restore instance type of the highest ranked 5-D vector. In more detail, the restore VM corresponding to the desired VM restore instance type performs a DR process at the cloud storage site to restore the VM identified in the 5-D vectors at the cloud storage site. Thus, when a problem has occurred at the production site, the production site VM is restored, and accessible, at the cloud storage VM.

As previously above, an exhaustive calibration procedure may be performed to facilitate selecting a restore instance type for disaster recovery. Embodiments of the invention further relate to methods for reducing the number of calibrations or evaluations that need to be performed, which results in substantial time and savings. Embodiments of the invention can reduce the number of calibrations, by way of example only, to 2K+K*log (N/K) wherein K is the number of different bandwidth options. For example, if there are 200 models or restore instance types, embodiments of the invention may perform 24 calibration runs instead of 200 calibration runs. This can substantially reduce the cost associated with identifying or selecting the optimal restore instance type.

Embodiments of the invention further account for additional factors (e.g., bandwidth, CPU) when performing calibration runs and/or when identifying an optimal or preferred restore instance type.

When measuring performance as the time needed for the restore VM to hydrate a VM (e.g., prepare the volumes and their data), lower times correspond to better performance. It is noted that the restore performance does not increase linearly with VM instance type. As discussed below, bandwidth may be a limiting performance constraint. For example, once bandwidth is fully utilized, increasing CPU does not improve performance of the restore VM because the operations being performed may be limited by bandwidth. It is also noted that the total time is linearly proportional or substantially linearly proportional to VM size. This allows the restore time and anticipated cost to be approximated based on size. Restoring a 200 GB baseline test VM allows the time and cost of recovering a 1 TB VM to be determined or approximated using a linear relationship.

Figure 4:
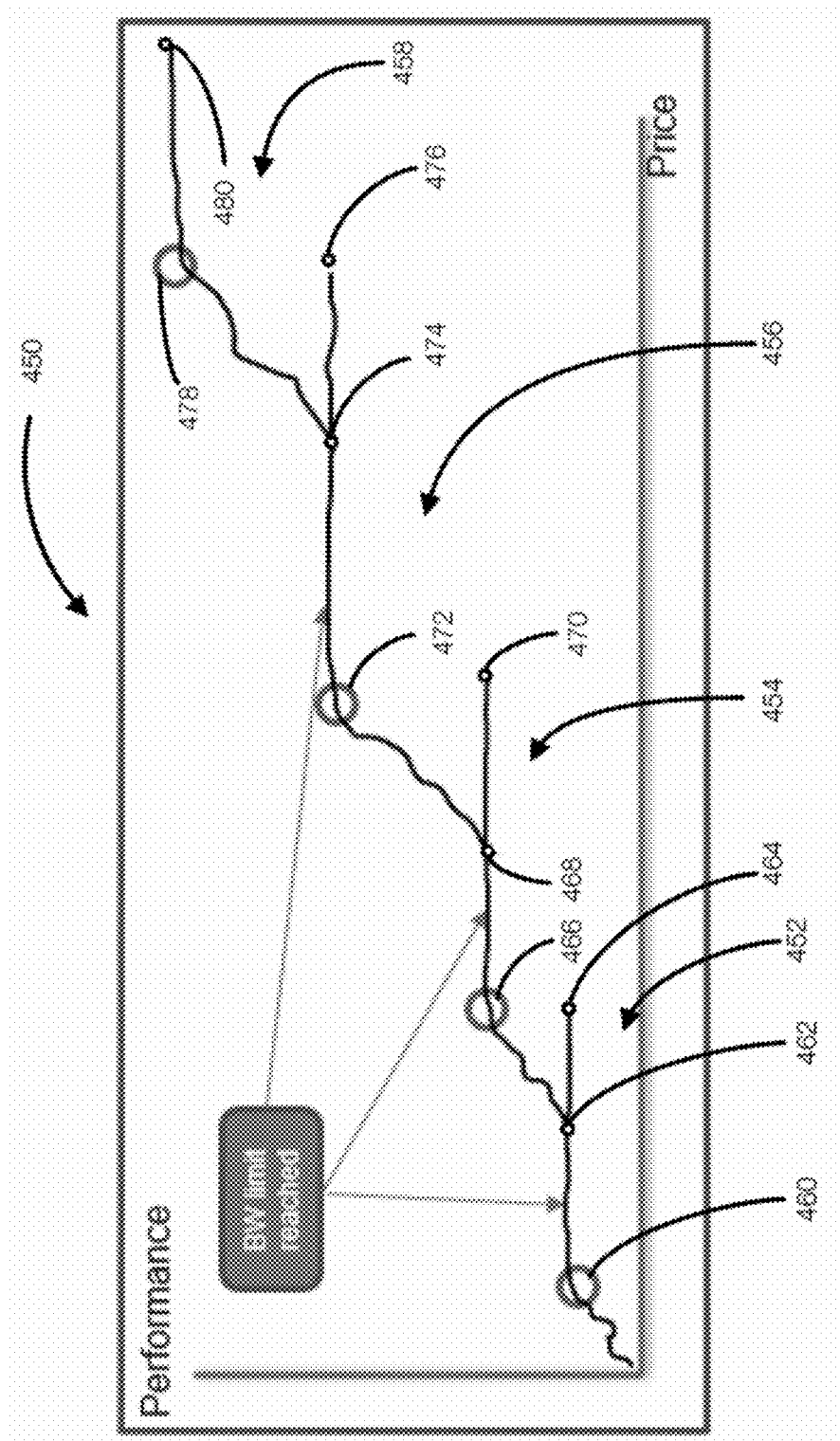
FIG. 4 illustrates a graph that identifies the performance of virtual machines based on available virtual machine instance types where a limiting factor is bandwidth.

FIG. 4 illustrates an example of a qualitative approximation of performance as a function of the restore instance price for a VM of fixed size. FIG. 4 illustrates a graph 450. The Y axis represents performance and the X axis represents price. The graph 450 illustrates four tiers 452, 454, 456, and 458. Each tier is essentially associated with restore instance types having the same bandwidth capabilities. As shown in the graph 450, each tier effectively plateaus and demonstrates that the performance of the restore instance types is impacted or limited by bandwidth. These plateaus represent where the bandwidth limit is reached for restore instance types of a given bandwidth capability.

Thus, the tier 452 is associated with restore instance types that may each be associated with a particular bandwidth. In this example, the tiers 452, 454, 456, and 458 are associated with, respectively, 1 GbE, 5 GbE, 10 GbE, and 25 GbE per network card capacity.

In effect, the graph 450 represents the performance/price of restore instance LU types offered by a cloud provider. The graph 450 demonstrates that bandwidth is a limiting factor. For example, for restore instance types associated with 1 GbE bandwidth (e.g., the tier 452), the performance increases with price until circle 460, which may correspond to a specific restore instance type. At circle 460, more powerful restore instance types (e.g., more memory, more vCPU) do not necessarily provide a significant increase in performance because of bandwidth limitations. As a result, selecting a restore instance on the plateaus after the circle 460 does not provide increased performance. The circle 460 effectively represents the restore instance that provides the best performance for the best price. More specifically, the circle 460 represents the best performance for the best price at least with respect to bandwidth. The circle 462 represents a branch from the plateau where new restore instances that have additional bandwidth become available at a corresponding price point. The circle 464 represents restore instance types that have more powerful CPU, but do not provide better performance that the restore instance type at the circle 460.

Stated differently, the circles 460, 466, 472, and 478 designate points of the best price/performance per bandwidth limit. The circles 460, 466, 472, and 478 designate the points where the price is minimal for the corresponding plateaus. The plateaus branch out at circles 462, 468, and 474 where there are new restore instance types with additional bandwidth. The circles 464, 470, 476, and 480 have more CPU power with no additional bandwidth.

The sections (e.g., from circle 462 to circle 466, from circle 468 to circle 472) between the plateaus are incrementing more or less linearly. However, there is some LU variance at least because vCPUs are in whole numbers and there may be variance in disk speeds, memory, and other parameters. The graph 450 essentially illustrates that there is little benefit (from the perspective of a specific bandwidth) in using instances on the plateaus after the circles 460, 466, 472, and 478 because the price of the restore instance types increase with no corresponding increase in performance. However, there may be restore instance types following circles 263, 468, and 474 that are not maxing out bandwidth. For example, restore instance types from the circle 462 to the circle 466 offer increased performance at least because more bandwidth is available for these restore instance types.

The graph 450 further illustrates that restore performance does not increase linearly with VM instance types, and that, at high performance points, bandwidth is the most limiting constraint (increasing CPU does not improve performance), and that total time for restore is linearly proportional to the VM size.

By way of example only, the graph 450 could be calibrated to restoring a 100 GB VM. Restoring a 1000 GB VM will take 10 times as long to complete. By accounting for the customer policy, which may cap the total target restore time (RTO), embodiments of the invention can select an optimal restore instance type to restore a VM of size X at some RTO using a calibration size C.

Figure 5:
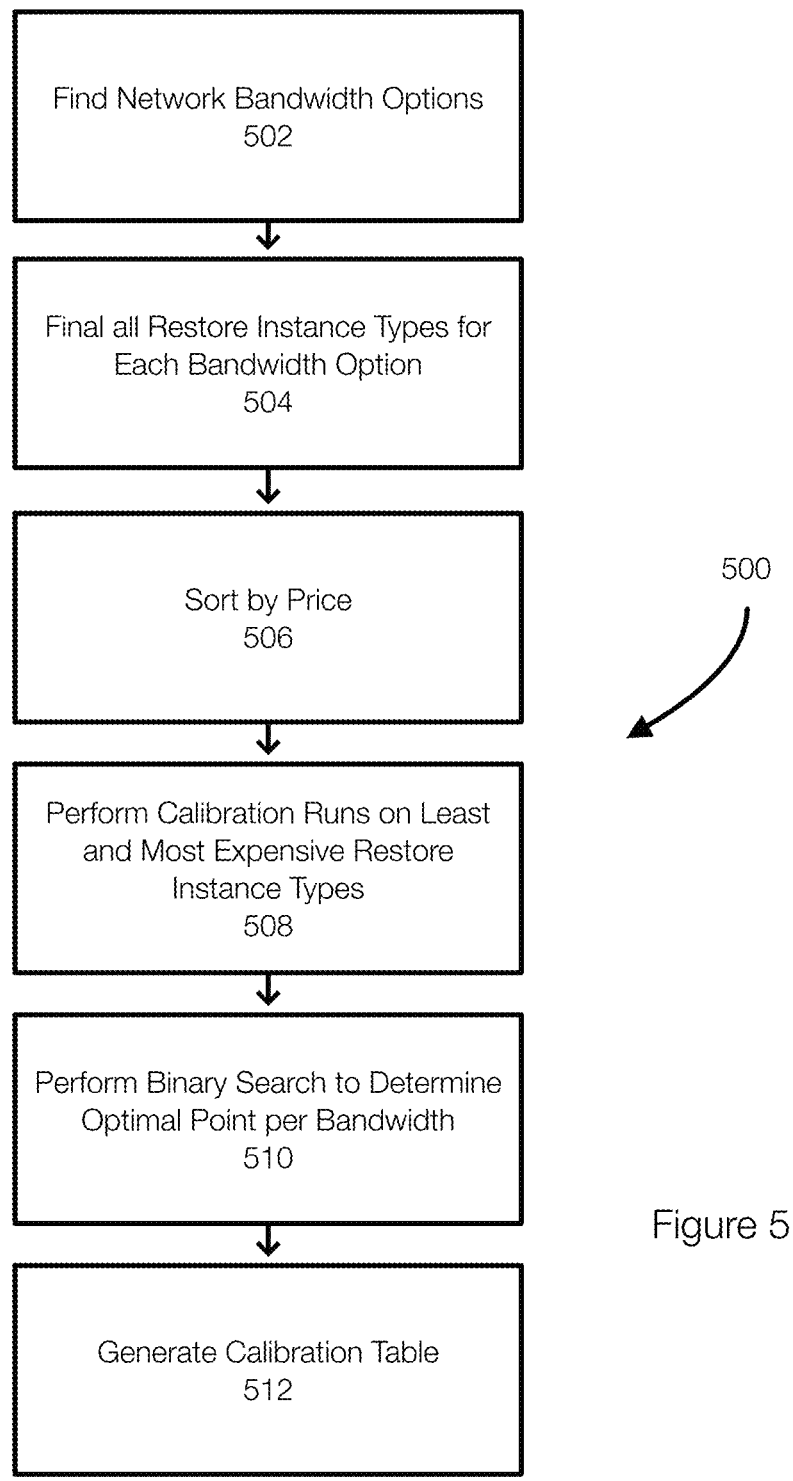
FIG. 5 is an example of a method for determining an optimal virtual machine restore instance type for performing a data protection operation.

FIG. 5 illustrates an example of a method for determining an optimal restore instance type. The method 500 generally illustrates the restore instance type that provides the best performance at the best price with respect to a particular bandwidth. In one example embodiment, a method 500 for determining an optimal LU restore instance type includes determining or finding 502 network bandwidth options. Generally, the cloud provider may provide this type of information. FIG. 1 illustrates an example of the bandwidth options for various restore instance types.

Next, all restore instance types for each bandwidth option are determined 504 and sorted 506 by price. Thus, the restore instance types may be marked as $RIType_i$. The $RIType_i$ are sorted according to price.

By way of example, the restore instance types available from a cloud provider may number in the hundreds. The metadata of these restore instance types can be queried and processed in order to generate lists of restore instance types that are sorted with respect to bandwidth and/or price. FIG. 1 also illustrates an example where restore instance types have been sorted by price and by bandwidth.

When there are hundreds of RI types, embodiments of the invention perform 508 calibration runs or tests on the least and most expensive restore instance types. The calibration tests are configured to determine a performance. The calibration of the most expensive test typically identifies the highest performance (Pmax) expected at a particular bandwidth level. With reference to FIG. 4, the graph 450 identifies tiers for each bandwidth level and effectively represents the calibration runs or evaluations of the restore instance types.

More specifically, a calibration run may include performing a data protection operation (e.g., a restore or recovery operation) of a baseline test VM. If the performance is measured in time, the performance of performing the same data protection operation on another virtual machine (e.g., recovering a production virtual machine) has a linear relationship with the performance of recovering the baseline test VM. The calibration run of the lest expensive restore instance time typically results in the lowest performance.

Although a calibration run could be performed on each restore instance type as previously discussed, embodiments of the invention perform 510 a binary search in order to determine the optimal point (e.g., performance/price as illustrated in FIG. 4) for each bandwidth level or tier. By way of example, a binary search (e.g., a half-interval, logarithmic search) is configured to find a target value in a sorted table or in a sorted list or in a sorted array. In one example, the restore instance types associated with a particular bandwidth constitute the sorted table or list. In embodiments of the invention, the search initially determines a value such as the performance value for the lowest and highest entries (e.g., the least and most expensive restore instance types). In one example, the value of the highest or most expensive entry become a target performance value. As discussed with respect to FIG. 4, the performance typically plateaus. However, one of the less expensive restore types will have substantially the same performance. Thus, the target performance is the same as or close to the maximum performance in one example. Embodiments of the invention identify that restore type instance using a binary search.

Next, the binary search compares the maximum performance with the performance value of the middle element of the table based on a calibration run on the middle element. This allows half of the array to be eliminated from the binary search based on how the performance value compares with the maximum performance value. If the value of the middle element is equal to the maximum performance, the upper half is discarded and the search is repeated with the lower half. This continues until an entry can be identified as the optimal restore instance type where the maximum performance is achieved at the lowest price. If the performance value of the middle element is below the maximum performance value, the bottom half is discarded and the process is repeated on the remaining half. As a result, the number of calibration runs performed needed to identify the optimal restore instance type is less than performing a calibration run on all of the restore instance types.

More specifically, because each tier typically has a plateau, the search allows the optimal point (e.g., circles 460, 466, 472, and 478 in FIG. 4) to be found without performing a calibration run on every restore instance type.

More generally, the binary search (e.g., may be performed for each tier) may begin by performing a calibration run on the least and most expensive restore instance types. After performing the calibration run on the least and most expensive restore instance types, the binary search may perform a calibration run on a restore instance somewhere between the least and most expensive restore instance types. An estimate may be made as to which entry is most likely to be the optimal restore instance type.

Typically, the midpoint or middle restore instance type is selected. If the performance is less than the maximum performance, another restore instance type is selected. For example, a restore instance that is in the middle between the midpoint restore instance and the most expensive restore instance and a calibration run is performed. If the performance is equal to the maximum performance, a calibration run is performed on restore instance between the midpoint restore instance and the least expensive restore instance type is performed. Using this type of binary search, the optimal restore instance type can be identified without performing a calibration run on every restore instance type. This is typically done per bandwidth level or tier.

Next, a calibration table is generated 512. The calibration table may include the 4 (or 5) dimensional vector for the instances used in the binary search performed at 510. Other entries in the calibration table for other restore instance types can be ignored or interpolated. Further, this allows a ranking to be determined or interpolated for each restore instance type. A customer may or may not rank the optimal restore instance time (best performance/price) when performing a data protection operation, but may select the restore instance type with the best ranking, which is based on the customer's policies.

In one example, the optimal option is determined by first calculating what is the minimal bandwidth needed to transfer a VM of size X in less than the RTO. Because the restore VM bandwidth is a bottleneck, the VM being restored has a size X, and the RTO is typically given or predefined, the actual bandwidth (ABW)=X/B<RTO.

As a result, the minimal value (mBW) can be found from the options found in 502 that is more than the ABW. If none exist, the one with the highest bandwidth option is selected.

FIG. 6 illustrates an example of a calibration table and of a binary search. In FIG. 6, some of the entries may be interpolated entries. Further, FIG. 6, for simplicity, do not necessarily include all of the restore instance types that may be available but are intended to represent the binary search and the identification of an optimal restore instance type.

For example and with reference to FIGS. 4-5, FIG. 6 illustrates a table 602 that includes the performance of restore instance types. In the binary search, a calibration run is performed on the least and most expensive restore instance types for the given bandwidth of 1 Gbps. The calibration run or evaluation results in a performance of 25 for the most expensive restore instance type (model 8) and a performance of 4 for the least expensive restore instance type (model 1). The binary search of FIG. 6 illustrates that a calibration run was performed on models 1, 4, 6, and 8. The number of calibration runs may differ. The order is as follows after performing the calibration runs 616 and 610, a calibration run 612 was performed on model 4 (which is the middle restore instance type between models 1 and 8). The calibration run 618 could have been performed on model 5 as well depending on how the midpoint is selected.

Because the performance of model 4 is 16, which is less than the maximum performance of 25, the next restore instance type selected for a calibration run is model 6 (which is the midpoint model between models 4 and 8). Thus, the bottom half of the list (e.g., models 1-3) is discarded. Next, the calibration run 614 is performed on the model 6. Because the performance is equal to the maximum performance, the models. 7 and 8 are discarded for purposes of determining the optimal restore instance type. Finally, a calibration run may be performed on model 5. With this information, the optimum restore instance type that gives the best performance and the best price is model 6. In this example, the model 6 corresponds to the circle 460 in FIG. 4. The model 6 was identified without performing a calibration run or an evaluation on all of the restore instance types. Further, interpolation can be performed to determine the performance of restore instance types that were not evaluated.

If there were 200 restore instance types, the midpoint method or binary search would achieve a similar result with considerably fewer calibration runs (e.g., about 7 or 8 per bandwidth tier).

Although a binary search is disclosed, other searching techniques could be applied to determine the optimal instance type. This may include machine learning based on the results of testing each instance type, a search that is based on previous results, or the like.

Embodiments of the invention allow the optimal restore instance type to be identified. Other entries in the calibration table can be interpolated. This allows a customer to select any of the restore instance types based on their policy. The customer is not required to select the optimal restore instance type. Embodiments of the invention, however, can ensure that a customer does not select a restore instance that is more expensive that the optimal restore instance type, particularly when there is no benefit in terms of performance for a given bandwidth.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect (s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data confidence fabric operations including pathing or routing operations. More generally, the scope of the invention embraces any operating environment in which the disclosed concepts may be useful.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, Microsoft Azure, Amazon AWS, and Google Cloud. More generally however, the scope of the invention is not limited to employment of any particular type or implementation of cloud storage.

In addition to the storage environment, the operating environment may also include one or more clients that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

Following are some further example embodiments of the invention. These are presented only by way of example and are not intended to limit the scope of the invention in any way.

Embodiment 1. A method, comprising receiving a package at a node of a data confidence fabric, wherein the package includes at least data, performing a trust insertion on the data based on a configuration file at the node, adding an annotation to the package that is associated with the trust insertion at the node, determining a path for the package in the data confidence fabric, wherein the path determined from the configuration file, and routing the package using the path.

Embodiment 2. The method of embodiment 1, further comprising determining the path by identifying a next node in the path based on a next trust insertion identified from the configuration file and routing the package to the next node, wherein the next node is configured to perform the next trust insertion.

Embodiment 3. The method of embodiment 1 and/or 2, further comprising dynamically searching for the next node in the path.

Embodiment 4. The method of embodiment 1, 2, and/or 3, wherein dynamically searching includes searching for the next node in the pathing map information stored by the node and/or broadcasting a request to other nodes to identify the next node.

Embodiment 5. The method of embodiment 1, 2, 3, and/or 4, further comprising determining a full path for the package in the data confidence fabric by identifying the path that best satisfies trust insertions included in the configuration file, wherein the full path is determined from pathing map information and the configuration file.

Embodiment 6. The method of embodiment 1, 2, 3, 4, and/or 5, further comprising determining a path based on a ledger score, wherein a path associated with a ledger that has a best representation of a confidence score rating is selected as the path.

Embodiment 7. The method of embodiment 1, 2, 3, 4, 5, and/or 6, wherein performing a trust insertion includes leveraging a nearby node to perform the trust insertion, wherein the nearby node is not part of the data confidence fabric.

Embodiment 8. The method of embodiment 1, 2, 3, 4, 5, 6, and/or 7, further comprising determining a path based using a round robin mode, a computation-based mode, or a broadcast mode.

Embodiment 9. The method of embodiment 1, 2, 3, 4, 5, 6, 7, and/or 8, further comprising joining a new node to the data confidence fabric, wherein the new node has a confidence score and wherein capabilities of the new node are broadcast to other nodes in the data confidence fabric and stored by the other nodes in their pathing map information that receive the broadcast from the new node.

Embodiment 10. The method of embodiment 1, 2, 3, 4, 5, 6, 7, 8, and/or 9, wherein each node includes a routing engine that is configured to determine the path, wherein the routing engine uses the configuration information and pathing map information as inputs to determine the path, wherein the pathing map information includes at least associations between nodes in the data confidence fabric and their trust insertion capabilities.

Embodiment 11. The method of embodiment 1, 2, 3, 4, 5, 6, 7, 8. 9, and/or 10, wherein determining the path includes determining the path such that an order of nodes follows an order of trust insertions identified in the configuration file.

Embodiment 12. The method of embodiment 1, 2, 3, 4, 5, 6, 7, 8, 9, 10, and/or 11, wherein the order of trust insertions identified in the configuration file are arranged in levels.

Embodiment 13. The method as recited in any combination of embodiments of or portions of embodiments 1-12.

Embodiment 14. A non-transitory storage medium having stored therein instructions that are executable by one or more hardware processors to perform the operations of any one or more of embodiments 1-13.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Any one or more of the entities disclosed, or implied, by the Figures and/or elsewhere herein, may take the form of, or include, or be implemented on, or hosted by, a physical computing device, one example of which is denoted at. As well, where any of the aforementioned elements comprise or consist of a virtual machine (VM), that VM may constitute a virtualization of any combination of the physical components disclosed herein.

In one example, the physical computing device includes a memory which may include one, some, or all, of random access memory (RAM), non-volatile random access memory (NVRAM), read-only memory (ROM), and persistent memory, one or more hardware processors, non-transitory storage media, UI device, and data storage One or more of the memory components of the physical computing device may take the form of solid-state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein including, but not limited to routing and pathing operations.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    identifying restore instance types associated with a cloud provider, each restore instance being associated with a bandwidth tier;
    performing a search on less than all of the restore instance types for each bandwidth tier, wherein the search is a binary search;
    for restore instance types not included in the search and included in a calibration table, interpolating results in the calibration table for restore instance types not included in the search;
    determining an optimal restore instance type from the restore instance types based on the search and based, in part, on a calibration run performed using a calibration data protection operation of a test VM; and
    performing a data protection operation with a restore virtual machine based on the optimal restore instance type.

2. The method as recited in claim 1, further comprising identifying the restore instance types and sorting the restore instance types by price.

3. The method as recited in claim 1, further comprising performing the calibration run for each restore instance while performing the binary search.

4. The method as recited in claim 1, further comprising applying a policy based at least on recovery price and recovery time to select a restore instance type for the data protection operation that is different from the optimal restore instance type.

5. The method of claim 4, further comprising generating a rank table that includes a ranking for each of the restore instance types.

6. The method of claim 1, further comprising:
    creating the test VM with a VM restore instance type that matches a VM restore instance type identified during performance of the search;
    using the test VM as a basis to create a test restore VM at a cloud storage site;
    restoring the test VM at the cloud storage site using the test restore VM;
    generating a 4-D baseline vector based on the restoration of the test VM, the 4-D baseline vector identifying a particular VM restore instance type;
    generating a 5-D vector based on the 4-D baseline vector;
    ranking the 5-D vector relative to one or more other 5-D vectors, all of the 5-D vectors identifying the same production site VM; and
    restoring, at the cloud storage site, the production site VM identified in the 5-D vectors, and the production site VM restored at the cloud storage site has a VM restore instance type identified in the highest ranked 5-D vector.

7. A non-transitory storage medium having stored therein computer-executable instructions which, when executed by one or more hardware processors, perform the operations:
    identifying restore instance types associated with a cloud provider, each restore instance being associated with a bandwidth tier;
    performing a search on less than all of the restore instance types for each bandwidth tier, wherein the search is a binary search;

for restore instance types not included in the search and included in a calibration table, interpolating results in the calibration table for restore instance types not included in the search;

determining an optimal restore instance type from the restore instance types based on the search and based, in part, on a calibration run performed using a calibration data protection operation of a test VM; and performing a data protection operation with a restore virtual machine based on the optimal restore instance type.

8. The non-transitory storage medium as recited in claim 7, the operations further comprising identifying the restore instance types and sorting the restore instance types by price.

9. The non-transitory storage medium as recited in claim 7, the operations further comprising performing the calibration run for each restore instance while performing the binary search.

10. The non-transitory storage medium as recited in claim 7, the operations further comprising applying a policy based at least on recovery price and recovery time to select a restore instance type for the data protection operation that is different from the optimal restore instance type.

11. The non-transitory storage medium as recited in claim 10, the operations further comprising generating a rank table that includes a ranking for each of the restore instance types.

12. The non-transitory storage medium as recited in claim 7, the operations further comprising:
creating the test VM with a VM restore instance type that matches a VM restore instance type identified during performance of the search;
using the test VM as a basis to create a test restore VM at a cloud storage site;
restoring the test VM at the cloud storage site using the test restore VM;
generating a 4-D baseline vector based on the restoration of the test VM, the 4-D baseline vector identifying a particular VM restore instance type;
generating a 5-D vector based on the 4-D baseline vector;
ranking the 5-D vector relative to one or more other 5-D vectors, all of the 5-D vectors identifying the same production site VM; and
restoring, at the cloud storage site, the production site VM identified in the 5-D vectors, and the production site VM restored at the cloud storage site has a VM restore instance type identified in the highest ranked 5-D vector.

* * * * *